United States Patent
Hirth et al.

(10) Patent No.: US 9,021,803 B2
(45) Date of Patent: May 5, 2015

(54) TURBINE FOR AN EXHAUST GAS TURBOCHARGER AND EXHAUST GAS TURBOCHARGER HAVING SUCH A TURBINE

(71) Applicants: Thorsten Hirth, Rutesheim (DE); Siegfried Sumser, Stuttgart (DE); Siegfried Weber, Stuttgart (DE)

(72) Inventors: Thorsten Hirth, Rutesheim (DE); Siegfried Sumser, Stuttgart (DE); Siegfried Weber, Stuttgart (DE)

(73) Assignee: Daimler AG, Stuttgart (DE)

(*) Notice: Subject to any disclaimer, the term of this patent is extended or adjusted under 35 U.S.C. 154(b) by 140 days.

(21) Appl. No.: 13/963,895

(22) Filed: Aug. 9, 2013

(65) Prior Publication Data

US 2014/0000256 A1     Jan. 2, 2014

Related U.S. Application Data

(63) Continuation-in-part of application No. PCT/EP2011/006093, filed on Dec. 6, 2011.

(30) Foreign Application Priority Data

Feb. 9, 2011     (DE) .................. 10 2011 010 744

(51) Int. Cl.
| | | |
|---|---|---|
| F02D 23/00 | (2006.01) | |
| F01D 17/14 | (2006.01) | |
| F02M 25/07 | (2006.01) | |
| F02B 37/02 | (2006.01) | |
| F02B 37/18 | (2006.01) | |
| F02B 37/22 | (2006.01) | |

(52) U.S. Cl.
CPC ............. *F02M 25/07* (2013.01); *F01D 17/141* (2013.01); *F02B 37/025* (2013.01); *F02B 37/18* (2013.01); *F02B 37/22* (2013.01); *Y02T 10/144* (2013.01); *F05D 2220/40* (2013.01)

(58) Field of Classification Search
CPC ....... F02M 25/07; F01D 17/141; F02B 37/18; F02B 37/025; F02B 37/22; F05D 2220/40; Y02T 10/144
USPC ............... 60/602, 605.1, 605.2; 415/157–158
See application file for complete search history.

(56) References Cited

U.S. PATENT DOCUMENTS

| | | | | |
|---|---|---|---|---|
| 4,886,416 A | * | 12/1989 | Wunderlich | .................. 415/158 |
| 5,267,829 A | * | 12/1993 | Schmidt et al. | ................. 415/48 |
| 5,855,117 A | * | 1/1999 | Sumser et al. | .................. 60/602 |
| 6,216,459 B1 | * | 4/2001 | Daudel et al. | ................ 60/605.2 |
| 6,669,441 B2 | * | 12/2003 | Bertnik et al. | ................ 415/158 |
| 2011/0067397 A1 | * | 3/2011 | Hirth et al. | ...................... 60/602 |

FOREIGN PATENT DOCUMENTS

| | | |
|---|---|---|
| DE | 25 36 711 | 3/1977 |
| DE | 196 51 498 C1 | 4/1998 |

(Continued)

*Primary Examiner* — Hoang Nguyen
(74) *Attorney, Agent, or Firm* — Klaus J. Bach

(57) ABSTRACT

In a turbine for an exhaust gas turbocharger having a turbine housing with a turbine rotor rotatable supported therein and including spiral channels for directing exhaust gas onto the turbine wheel, at least one annular blocking element is supported between the spiral channels and the turbine wheel so as to be rotatable in the peripheral direction of the turbine wheel and additionally movable in the axial direction of the turbine wheel for a controlling the exhaust gas flow to the turbine wheel between impulse turbine mode when extended into the space between the turbine wheel and the spiral chamber and an accumulation made when retracted, with the gas flow through the turbine wheel or by-passing the turbine wheel being adjustable by rotation of the blocking element.

8 Claims, 10 Drawing Sheets

(56) References Cited

FOREIGN PATENT DOCUMENTS

| | | |
|---|---|---|
| DE | 10 2008 039 085 A1 | 2/2010 |
| DE | 10 2009 012 131 A1 | 9/2010 |
| EP | 2 103 792 A2 | 9/2009 |
| EP | 2 103 793 | 9/2009 |
| WO | WO 2006/102912 | 10/2006 |

* cited by examiner

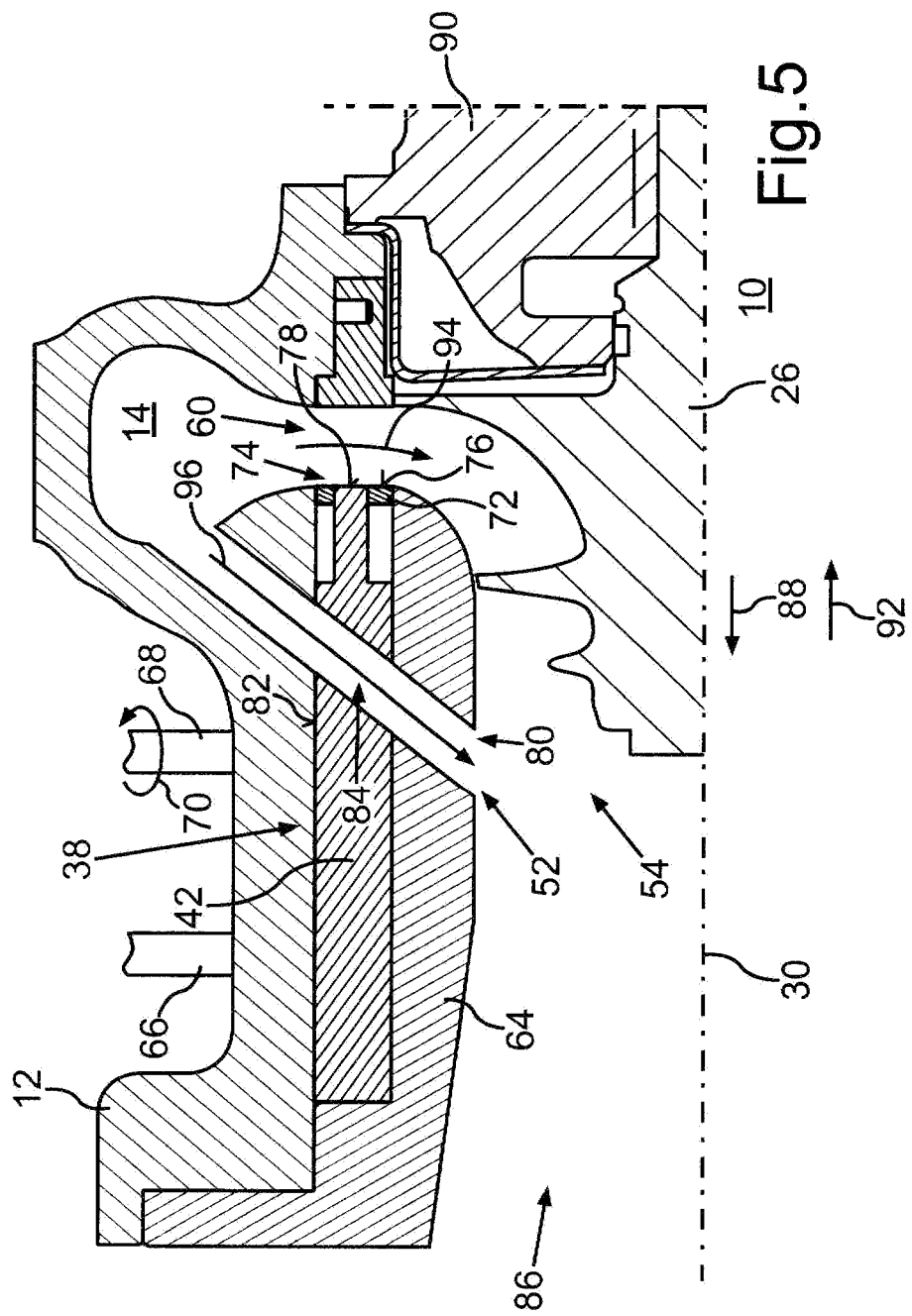

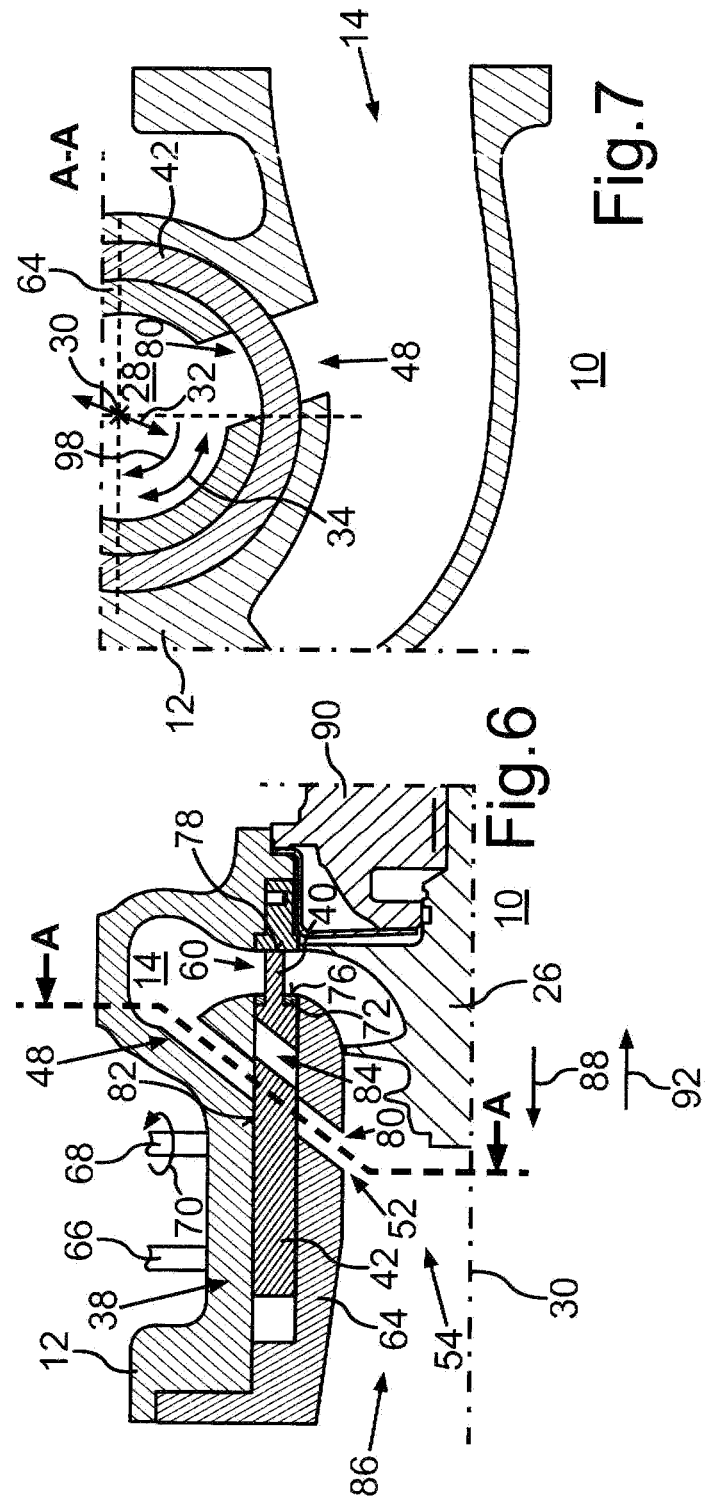

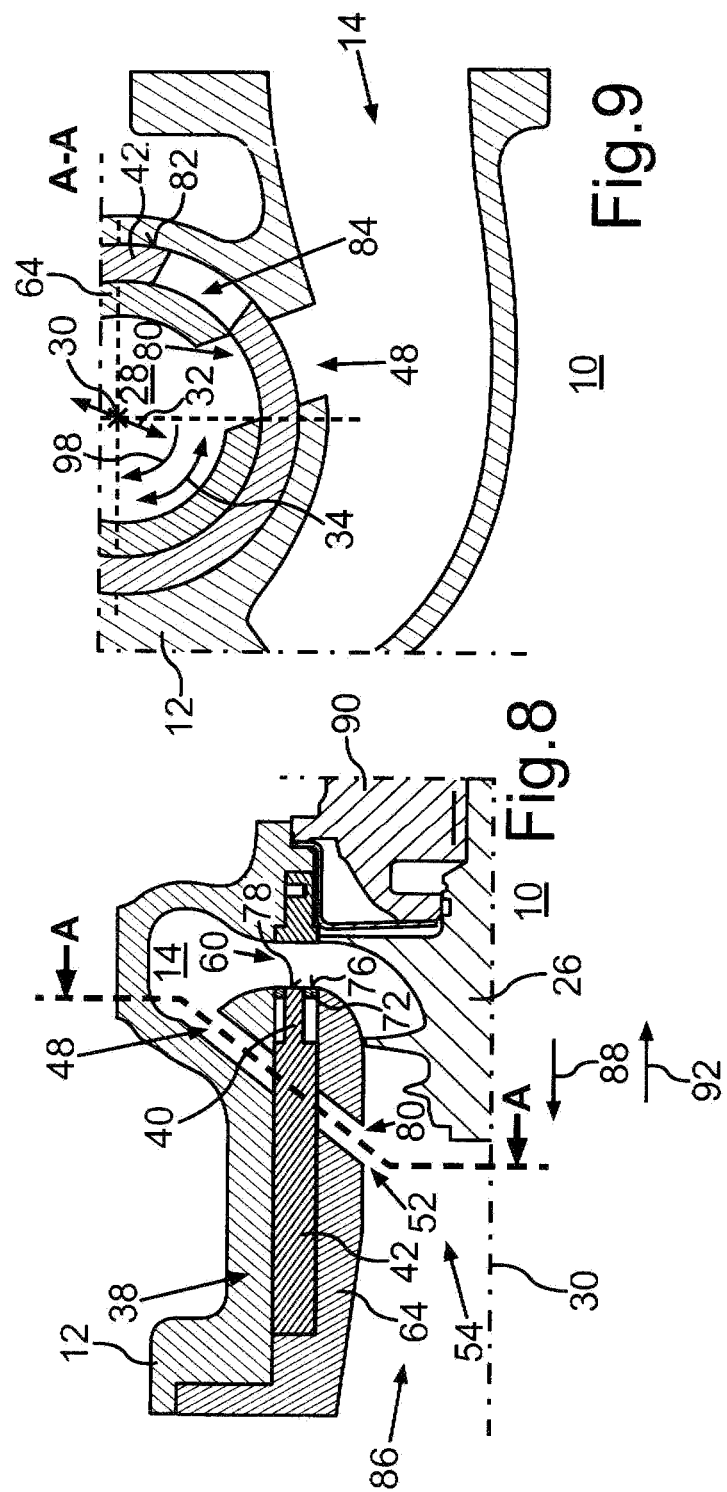

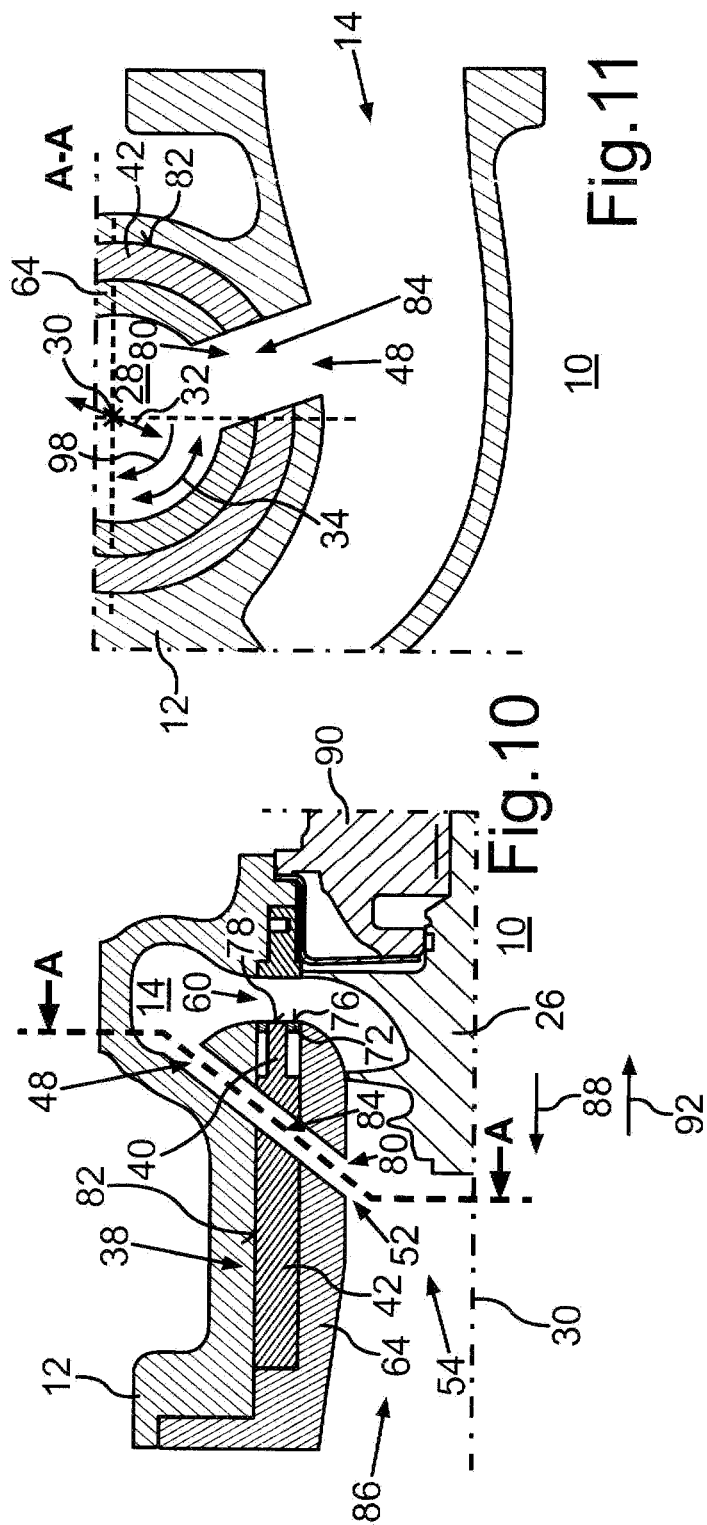

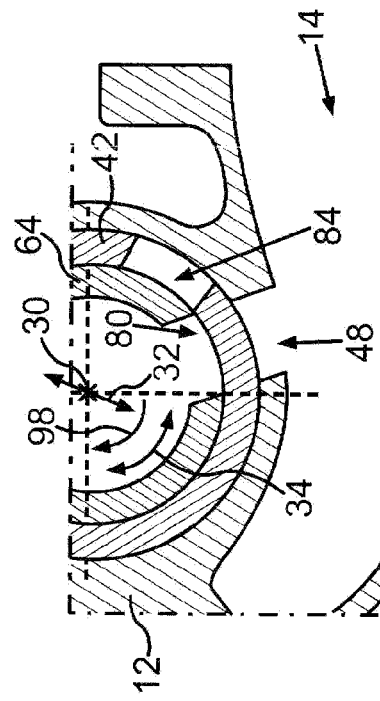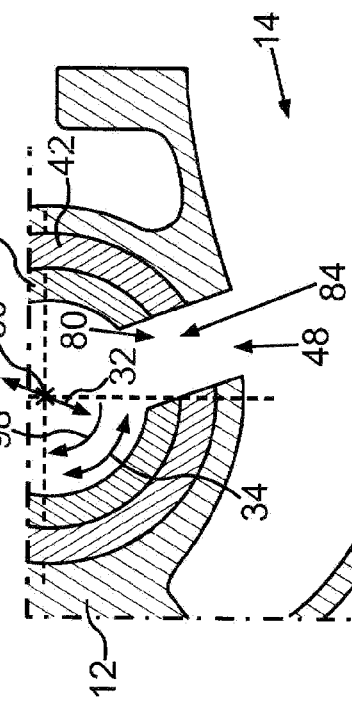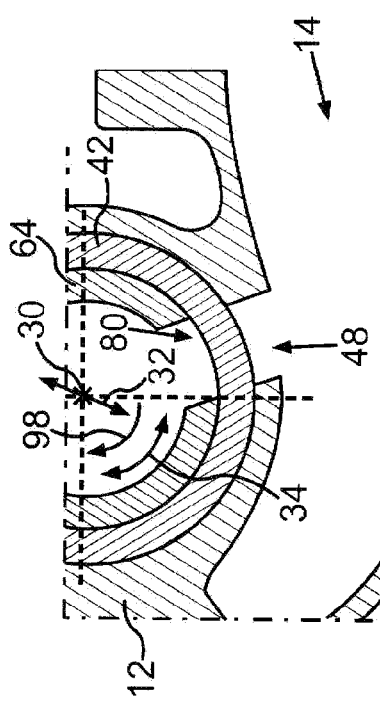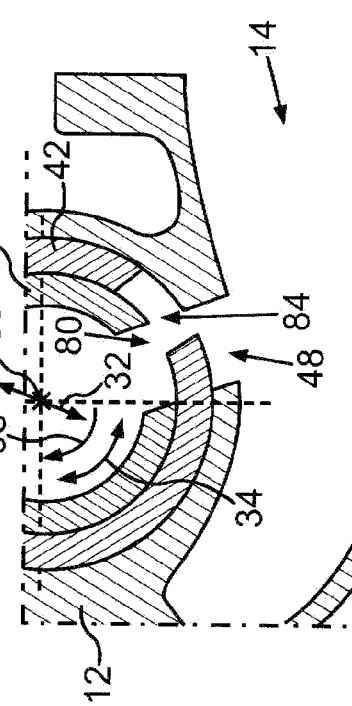

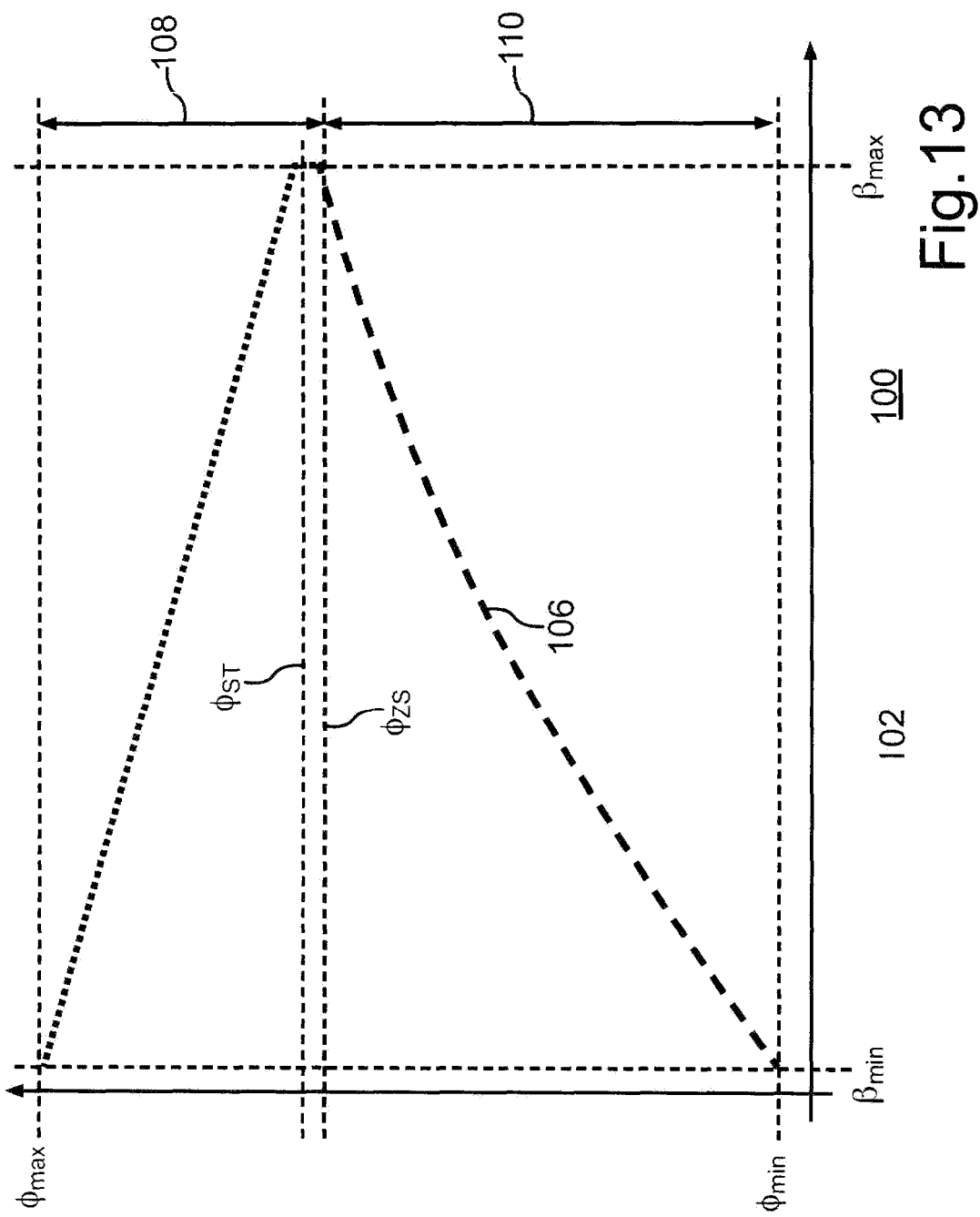

US 9,021,803 B2

TURBINE FOR AN EXHAUST GAS TURBOCHARGER AND EXHAUST GAS TURBOCHARGER HAVING SUCH A TURBINE

This is a Continuation-In-Part application of pending international patent application PCT/EP2011/006093 filed Dec. 6, 2011 and claiming the priority of German patent application 10 2011 010 744.4 filed Feb. 9, 2011.

BACKGROUND OF THE INVENTION

The invention relates to a turbine for an exhaust gas turbocharger having a spiral channel for supplying exhaust gas to a turbine wheel and being provided with an annular blocking element which surrounds the turbine wheel and is rotatably supported for controlling the admission of exhaust gas to the turbine wheel and also to an exhaust gas turbocharger having such a turbine.

DE 25 39 711 A1 discloses a spiral housing for turbomachines, in particular in an exhaust gas turbocharger, having a cross section which is adjustable at least in parts, at least one tongue being provided which is slidingly guided at the radially inner wall of the spiral housing and displaceable in connection with this wall in the peripheral direction.

An internal combustion engine for a motor vehicle is known from DE 10 2008 039 085 A1 having an exhaust gas turbocharger which includes a compressor disposed in an intake tract of the internal combustion engine and a turbine in an exhaust tract of the internal combustion engine. The turbine has a turbine housing which includes a spiral channel which is coupled to an exhaust line of the exhaust tract. A turbine wheel is situated within an accommodation space in the turbine housing, and a compressor wheel of the compressor is connected to the turbine wheel in a rotationally fixed manner via a shaft and may be acted on by exhaust gas of the internal combustion engine The turbine includes an adjusting device by means of which a spiral inlet cross section of the spiral channel as well as a nozzle cross section of the spiral channel are jointly adjustable with respect to the accommodation space.

To keep the fuel consumption of internal combustion engines, and thus their $CO_2$ emissions, low, the internal combustion engines are provided with charging devices so that the internal combustion engines are suppliable with compressed air, which by means of the exhaust gas of the internal combustion engine is compressed via a corresponding exhaust gas turbocharger. Thus, the internal combustion engines may be designed according to the so-called downsizing principle, which means that the internal combustion engines have a relatively small volume but are able to provide particularly high power and torque. Thus, the internal combustion engines have very high specific power and torque. As a result, the requirements for the charging devices are continually increasing, in particular with regard to adaptability of the charging devices to different operating points so that efficient operation of the charging devices is achievable.

SUMMARY OF THE INVENTION

In a turbine for an exhaust gas turbocharger having a turbine housing with a turbine rotor rotatably supported therein and including spiral channels for directing exhaust gas onto the turbine wheel, at least one annular blocking element is supported between the spiral channels and the turbine wheel so as to be rotatable in the peripheral direction of the turbine wheel and additionally movable in the axial direction of the turbine wheel for a controlling the exhaust gas flow to the turbine wheel between impulse turbine mode when extended into the space between the turbine wheel and the spiral chamber and an accumulation made when retracted, with the gas flow through the turbine wheel or by-passing the turbine wheel being adjustable by rotation of the blocking element.

Such a turbine for an exhaust gas turbocharger, in particular for an internal combustion engine or a fuel cell, includes at least one turbine housing, having an accommodation space, which includes at least one spiral channel through which exhaust gas may flow. The spiral channel has a flow cross section via which a turbine wheel which is accommodated, at least in parts, in the accommodation space and which is rotatable about a rotational axis may be acted on by the exhaust gas. The turbine also includes at least one blocking element which is rotatable about the rotational axis of the turbine wheel, at least essentially in the peripheral direction of the accommodation space, and by means of which the flow cross section is adjustable.

According to the invention, it is provided that the blocking element is additionally movable, in particular displaceable, in the axial direction of the turbine wheel between at least one first position and one second position. This means that the blocking element is not only rotatable relative to the turbine housing in the peripheral direction of the accommodation space, but is also movable, in particular displaceable, relative to the turbine housing in the axial direction of the turbine wheel. This provides for a particularly extensive and flexible adjustment capability of the blocking element, so that the turbine may be adapted to different operating points, in particular to the internal combustion engine associated with it, in a particularly flexible manner according to demand and in a particularly large range. This results in more efficient operation of the turbine according to the invention, at least essentially in the entire characteristic map of the internal combustion engine, which is accompanied by reduced fuel consumption and reduced $CO_2$ emissions of the internal combustion engine.

The blocking element allows the in particular narrowest flow cross section in the direction of flow of the exhaust gas through the turbine housing to be variably set upstream from the turbine wheel, so that the so-called throughput parameter of the turbine as well as its accumulation behavior may be adjusted, and adapted to an existing operating point, in particular of the internal combustion engine.

The turbine according to the invention is thus a variable turbine, which in particular due to the wide range of adjustability of the blocking element in the peripheral direction of the accommodation space as well as in the axial direction of the turbine wheel has a very high throughput range, which is accompanied by more efficient operation. The turbine according to the invention is usable in internal combustion engines which are designed as gasoline engines, diesel engines, diesel-gasoline engines, or other types of internal combustion engines. The turbine according to the invention is particularly advantageous for use in gasoline engines, since gasoline engines in particular require a much larger throughput range of the turbine than is the case for diesel engines, for example. The turbine according to the invention is able to meet these requirements for the throughput range, so that the turbine, and thus the internal combustion engine, may be operated in a particularly efficient manner.

The turbine according to the invention also has the advantage that it has very high operational reliability, in particular with regard to adjustment characteristics of the blocking element. The blocking element provides relatively uncomplicated, simple, and robust adjustability of the turbine, so that even for particularly demanding criteria, for example for gasoline engines in which exhaust gas temperatures of up to 1050° C. are present, the rotatability in the peripheral direction as well as the axial motion of the blocking element is provided, even over a high service life and under high loads.

The turbine according to the invention thus has particularly advantageous thermodynamic behavior, and a high throughput range coefficient of $\phi max/\phi min$, which preferably is in a range from equal to or greater than 4.5 up to and including 6. The term $\phi_{max}$ refers to the maximum settable throughput parameter of the turbine according to the invention due to rotation and movement of the blocking element, while $\phi_{min}$ refers to the minimum settable throughput parameter of the turbine according to the invention due to rotation and movement of the blocking element.

Furthermore, the turbine according to the invention has proven extremely advantageous due to the fact that only a small number of control elements, referred to as actuators, are provided and necessary, which keeps the application effort for the turbine according to the invention, and thus its costs, low. In addition, the turbine together with the blocking element has only very small installation space requirements and a low weight, which benefits the efficient operation of the turbine and of the internal combustion engine associated with it.

In one advantageous embodiment of the invention, in the axial direction the blocking element is movable solely between the first position, in which the blocking element is situated, at least in parts, in a turbine wheel inlet area, and the second position, in which the blocking element is at a distance from, in particular completely remote from, the turbine wheel inlet area with respect to the first position. This means that in the first position, the in particular narrowest flow cross section is adjustable upstream from the turbine wheel by means of the blocking element, the in particular narrowest flow cross section being formed or delimited, for example, in parts by a wall of the spiral channel which is fixed relative to the turbine housing, and in parts by the blocking element which is movable (rotatable and movable in the axial direction) relative to the turbine housing. In the first position, the in particular narrowest flow cross section may be variably set upstream from the turbine wheel by rotating the blocking element, in order to be able to adapt the turbine according to the invention to different operating points of the internal combustion engine in a particularly flexible manner according to demand.

In the second position, the blocking element is in particular completely remote from the turbine wheel inlet area, so that the in particular narrowest flow cross section upstream from the turbine wheel is formed or delimited in particular solely by walls of the spiral channel which are fixed relative to the turbine housing. In this way, a particularly high throughput range of the turbine according to the invention together with a very large maximum settable throughput parameter ($\phi_{max}$) and with a minimum throughput parameter ($\phi_{min}$) which is particularly small in comparison may be achieved in combination with influencing of an advantageous, appropriate effect characteristic, in particular for customary displacement paths of the corresponding actuator for the requirements of the internal combustion engine. For diesel engine applications, a throughput range coefficient of at least essentially 4 may thus be achieved. For gasoline engine applications, a throughput range coefficient of at least 5 is achievable due to the described movability of the blocking element. The turbine according to the invention may thus be used even for very high exhaust gas mass flows, which occur in particular in gasoline engines, and may ensure efficient operation with low energy consumption.

This is achieved in a particularly simple and cost-effective manner, since the blocking element is movable only, i.e., exclusively, in the axial direction between the first position and the second position. This keeps the level of control and regulation effort, and thus the application effort, for the turbine according to the invention low, which is accompanied by low costs.

A so-called tongue diverter mode of the turbine according to the invention may be carried out in the first position of the blocking element. In the first position of the blocking element, which is designed as an airfoil-shaped tongue, for example, by rotating the blocking element the flow cross section of the spiral channel may be adjusted according to demand, and set to the existing operating point as well as to a charge pressure requirement of the internal combustion engine.

If the turbine has at least two ducts which are fluidly separate from one another, at least in parts, and via which the exhaust gas may be led to the turbine wheel, in the tongue diverter mode a duct separation is provided almost to the turbine wheel.

In the second position, the blocking element is situated at a distance, for example, from a nozzle via which the exhaust gas flows against the turbine wheel essentially in the radial direction thereof, so that the exhaust gas does not, and in contrast to the first position, no longer, flows against and around the blocking element. The nozzle is, for example, a ring-shaped inflow channel upstream from the turbine wheel. As a result, the flow cross section is set or settable to be even greater compared to the first position. If the turbine, as previously described, has at least the two ducts, in the second position a fluid connection of the individual ducts may be provided upstream from the turbine wheel. An accumulation charge mode of the turbine may be set due to this connection of the ducts, so that the exhaust gas upstream from the turbine wheel initially is accumulated or collected due to the connection of he ducts, and only then does it flow against the turbine wheel for driving same.

At this point it is noted that the turbine housing may have a plurality of spiral channels having a respective flow cross section, at least one blocking element advantageously being associated with each of the flow cross sections, by means of which the respective flow cross section is variably settable in the first position by rotating the corresponding blocking element in the peripheral direction of the accommodation space of the turbine wheel, and in particular about the rotational axis thereof.

It may be provided that the turbine includes two ducts, at least two spiral channels as sub-ducts being associated with one duct. This means that this duct is then fluidly connected to the two spiral channels, so that the exhaust gas may flow from the duct into the two spiral channels, the duct upstream from the turbine wheel thus being divided into the two spiral channels.

The spiral channels are also referred to as segments, since they allow flow against the turbine wheel over its periphery in the peripheral direction thereof via the individual segments provided by the spiral channels. If the turbine includes multiple spiral channels, i.e., segments, a multisegment turbine is thus provided which allows particularly advantageous flow against the turbine wheel and particularly advantageous charging of the internal combustion engine.

In one advantageous embodiment of the invention, the blocking element is connected to an adjusting part, in particular an adjusting ring, which is movable together with the blocking element, by means of which the blocking element is rotatable in the peripheral direction and movable in the axial direction. A bypass channel of the turbine via which exhaust gas may bypass the turbine wheel is fluidly blocked, in particular continuously, by means of the adjusting part in one of the positions, in particular in the first position. In addition, a flow cross section of the bypass channel may be fluidly enabled, at least in parts, in the other of the positions, in particular in the second position, by means of the adjusting part. In other words, the flow cross section in the first position is fluidly blocked, so that exhaust gas does not flow through the bypass channel, and therefore exhaust gas is not able to bypass the turbine wheel without driving the turbine wheel.

In the second position, in which the at least one blocking element is in particular completely remote from the nozzle, the flow cross section is enabled or may be enabled, at least in parts, so that in the second position it is possible for exhaust gas to flow through the bypass channel, and thus for this exhaust gas to bypass the turbine wheel without driving it. So-called bypassing of the turbine wheel is thus achieved, so that a particularly large throughput parameter is settable. This is accompanied by the provision of a particularly high throughput range of the turbine according to the invention, which is designed as a radial turbine, for example, so that the turbine is adjustable according to demand at operating points of the internal combustion engine at least essentially in the entire characteristic map of the internal combustion engine. It may be provided that the turbine also has at least two or more bypass channels which in the first position are fluidly blocked, and which in the second position are or may be fluidly enabled, at least in parts.

For fluidly blocking or fluidly enabling the at least one bypass channel, i.e., its flow cross section, it may be provided that the adjusting part, in particular the adjusting ring, has an opening which is delimited by walls of the adjusting part. In the first position the flow cross section of the bypass channel is in particular completely covered and thus fluidly blocked by the walls of the adjusting part. For enabling the flow cross section, i.e., the bypass channel, in the second position, the opening in the adjusting part may be moved into alignment, at least in parts, with the flow cross section of the bypass channel, and thus with the bypass channel, so that the exhaust gas may flow through the bypass channel and the adjusting part via its opening.

During this bypassing of the turbine wheel, for example exhaust gas is branched off from the spiral channel, and downstream from the turbine wheel is supplied to a turbine wheel outlet area or turbine outlet area positioned in the turbine housing downstream from the turbine wheel. For this purpose, the bypass channel has, for example, an inlet cross section via which the bypass channel opens into the spiral channel. In addition, it may be provided that the bypass channel has an outlet cross section via which the bypass channel opens into the turbine outlet area, at least in parts, downstream from the turbine wheel. The exhaust gas may flow from the spiral channel, via the inlet cross section, into the bypass channel and flow out of the bypass channel via the outlet cross section.

The adjusting part, in particular the adjusting ring, is accommodated, at least in parts, in particular completely, in the turbine housing so as to be movable relative thereto, the turbine housing being movable together with the blocking element for moving the blocking element between the first position and the second position as well as moving the blocking element in the axial direction of the turbine wheel. For rotating the blocking element, the adjusting part is rotatable in the peripheral direction of the accommodation space, in particular about the rotational axis of the turbine wheel For this purpose, the adjusting part cooperates, for example, with an actuator, in particular a motor, which is able to rotate the adjusting part. Due to the connection with the blocking element, the rotation of the adjusting part causes the blocking element to correspondingly rotate. This is particularly advantageous when the turbine according to the invention includes a plurality of blocking elements which are then preferably connected to the adjusting part and movable via the adjusting part, i.e., rotatable in the peripheral direction and also movable in the axial direction. Thus, it is only necessary for the adjusting part to cooperate with the actuator and for the adjusting part to be moved, which causes a motion of all blocking elements together with the adjusting part.

The flow cross section of the bypass channel is preferably settable in the other of the positions, in particular in the second position, by means of the adjusting part. If the adjusting part is rotated, for example, the flow cross section may be variably set by rotating the adjusting part. It may be provided that the adjusting part (and thus the blocking elements) may be moved, in particular rotated, in the other of the positions, in particular in the second position, between a first rotational position of the adjusting part, provided as an end position of an adjustment angle range of the adjusting part, and a further rotational position, provided as a further end position of the adjustment angle range. In one of these rotational positions the opening in the adjusting part is in alignment, at least in parts, with the flow cross section of the bypass channel, so that exhaust gas may flow through the bypass channel while bypassing the turbine wheel. In contrast, the flow cross section is narrowed, in particular fluidly blocked, in the further rotational position, so that a small volume flow or mass flow of the exhaust gas, or no exhaust gas, is able to flow through the bypass channel. In the first rotational position it may be provided that the flow cross section is completely enabled, so that the flow cross section or the bypass channel experiences no throttling by the adjusting part, and a particularly large quantity of exhaust gas is able to flow through the bypass channel.

The adjusting part for setting the flow cross section of the bypass channel is also preferably rotatable into at least one intermediate position between rotational positions designed as end positions, so that the flow cross section of the bypass channel may in particular be set according to demand. The flow cross section may particularly advantageously be set at least essentially in a stepless manner and/or at least essentially continuously between the end positions in the adjustment angle range of the adjusting part, so that by rotating the adjusting part in one rotational direction, the flow cross section, for example starting from a completely fluid blocking of the flow cross section, is successively enabled and thus the flow cross section is successively enlarged until, for example, it is maximally, and in particular completely, enabled. If the adjusting part is rotated, for example, into a second rotational direction opposite from this rotational direction, the flow cross section of the bypass channel, starting from an in particular complete enabling of the flow cross section, is successively narrowed and thus reduced until the flow cross section is completely fluidly blocked, for example, so that exhaust gas is not, or is no longer, able to flow through the bypass channel.

This adjustability of the bypass channel provides further adjustability of the turbine for setting its throughput parameter according to demand, which in particular benefits the efficient operation of the turbine according to the invention, and thus the operation of the internal combustion engine with low fuel consumption and low $CO_2$ emissions.

If the adjusting part is rotated in the second position, in which the blocking element is at a distance from the turbine wheel inlet area, this is accompanied by a rotation of the blocking element. However, since the blocking element is at a distance from the turbine wheel inlet area, the rotation of the adjusting part does not result in adjustment of the in particular narrowest flow cross section of the spiral channel upstream from the turbine wheel.

For achieving a small adjustment angle range, the bypass channel may particularly advantageously be fluidly blocked or enabled by rotating the adjusting part in a first rotational direction, the first rotational direction of the adjusting part being opposite from a second rotational direction of a subsequent or preceding movement of the blocking element. That is, for example for opening the bypass channel, starting from a bypass channel which is blocked by the adjusting part and a blocking element positioned in the nozzle, initially the blocking element is maximally rotated in a first rotational direction. The blocking element is subsequently axially displaced so that the nozzle is completely open, This operation is followed by a rotation of the adjusting part in a second rotational direction, in particular the second rotational direction being opposite from the first rotational direction, so that a small adjustment angle range is sufficient for achieving a large throughput range coefficient. This allows small displacement paths, which in turn results in less wear.

Based on the above-mentioned tongue diverter mode of the turbine according to the invention, it may be provided that the bypass channel, which represents a so-called wastegate of the turbine, is fluidly blocked. In the accumulation charge mode it may be provided that the bypass channel is initially fluidly blocked. If the adjusting part is then appropriately rotated and the flow cross section is fluidly enabled, the turbine wheel is bypassed in the accumulation charge mode, also referred to as accumulation turbine mode, so that the throughput parameter is successively increased by successively enabling the flow cross section of the bypass channel, thus allowing a particularly large maximum throughput parameter to be set. This is accompanied by a particularly large throughput range ratio.

In another advantageous embodiment of the invention, a receiving part, in particular a matrix, is provided in which the blocking element is accommodated, at least in parts, at least in one of the positions, in particular in the second position, the receiving part, in particular the matrix, being fixed in the axial direction and rotatable in the peripheral direction of the accommodation space. On the one hand, the matrix allows the blocking element to be accommodated in the second position, thus minimizing or avoiding vortex formation or other types of power losses, so that the exhaust gas may flow against the turbine wheel via the nozzle, for example, in a particularly flow-optimized manner. On the other hand, the matrix, i.e., the receiving part, allows rotation of the blocking element in particular into the second position, and thus the rotation of the adjusting part, so that the flow cross section of the bypass channel may be variably set. The receiving part is fixed in the axial direction, so that the blocking element moves relative to the matrix during a motion from the first position into the second position.

The nozzle or a supply channel via which the exhaust gas is supplied to the turbine wheel is delimited in parts by a wall which extends at least essentially radially with respect to the turbine wheel. In addition, the nozzle or the supply channel may be delimited, at least in parts, by an at least essentially radially extending wall of the blocking element, so that undesirable vortex formation or other types of power losses does/do not result in the turbine wheel inlet area, and [exhaust gas] may flow against the turbine wheel, in particular in the second position of the blocking element, in a flow-optimized manner. Leakage flow of the exhaust gas is also avoided in this way.

In another advantageous embodiment of the invention, the turbine has at least two ducts which are fluidly separate from one another, at least in parts, and via which the turbine wheel may be acted on by exhaust gas. In one of the positions, in particular in the first position, the turbine is operable in a pulse charging mode, also referred to as pulse turbine mode, so that pulse charging of the internal combustion engine is made possible. In the other of the positions, in particular in the second position, the turbine is operable in an accumulation turbine mode, so that accumulation charging of the internal combustion engine is made possible. In one of the positions, in particular in the first position, the ducts are fluidly separate from one another until shortly, in particular directly, upstream from the turbine wheel, resulting in pulse turbine mode. If the blocking element is moved in the axial direction into the other of the positions, in particular into the second position, the ducts are fluidly connected to one another upstream from the turbine wheel, thus forming a collection chamber, so to speak, in which the exhaust gas upstream from the turbine wheel is initially collected and accumulated, and only then flows against the turbine wheel. Exhaust gas may overflow from one of the ducts or from corresponding segments of this duct into the second duct or into corresponding segments of the second duct. The turbine according to the invention thus has particularly high flexibility with regard to adaptability to different operating points of the internal combustion engine in order to achieve efficient operation which is low in fuel consumption and $CO_2$ emissions.

In another advantageous embodiment, it is provided that in pulse turbine mode, a throughput parameter of the turbine which increases with rotation is settable by rotating the blocking element in a rotational direction, and in accumulation turbine mode, a throughput parameter of the turbine which decreases with rotation is settable by rotating the blocking element in this rotational direction.

If the blocking element is in the first position, for example, and the blocking element is rotated in this rotational direction, for example the flow cross section of the spiral channel is thus successively enabled, so that the throughput parameter of the turbine successively increases.

If the blocking element is in the second position and the blocking element, and thus the adjusting part, is rotated in this rotational direction, for example the flow cross section of the bypass channel is thus successively decreased, starting from a fluid enabling of the bypass channel, so that the throughput parameter of the turbine according to the invention is decreased upon rotation in this rotational direction, since an increasingly lower mass flow or volume flow of the exhaust gas is able to flow through the bypass channel, until the bypass channel is, for example, completely fluidly blocked. Conversely, this means that in the second position of the blocking element, rotating the blocking element, and thus the adjusting part, in a rotational direction opposite from the above-mentioned rotational direction likewise results in a throughput parameter of the turbine which increases with rotation, since during the rotation of the blocking element and of the adjusting part in this further rotational direction which is opposite from the first rotational direction, the flow cross section of the bypass channel is successively enabled, and therefore an increasingly greater mass flow or volume flow of the exhaust gas is able to flow through the bypass channel, resulting in a throughput parameter of the turbine according to the invention which becomes increasingly larger. In this way, the turbine is particularly advantageously settable, and adaptable to different operating points of the internal combustion engine.

The bypass channel is preferably integrated at least in parts, in particular completely, into the turbine housing. This means that the bypass channel extends within the turbine housing at least in parts, in particular completely, and is delimited by corresponding walls of the turbine housing.

The second aspect of the invention relates to an exhaust gas turbocharger, in particular for an internal combustion engine or for a fuel cell, having a turbine according to the invention. Advantageous embodiments of the first aspect of the invention are to be regarded as advantageous embodiments of the second aspect of the invention, and vice versa. For moving the blocking element, and thus the adjusting part, from the first position into the second position, it may be provided that the blocking element and the adjusting part are moved, in particular displaced, in the direction of a turbine outlet of the turbine in the axial direction of the turbine wheel. Correspondingly, when moving from the second position into the first position, the blocking element and the adjusting part are moved, in particular displaced, in the opposite direction, this direction pointing, for example, toward a bearing housing of the exhaust gas turbocharger in which a shaft of the exhaust gas turbocharger is rotatably mounted.

This shaft on the one hand is connected in a rotationally fixed manner to the turbine wheel, and on the other hand is connected in a rotationally fixed manner to a compressor wheel of a compressor of the exhaust gas turbocharger, so that the compressor wheel, and thus the compressor, may be driven by the turbine wheel via the shaft due to the turbine wheel being acted on by the exhaust gas. It is thus possible to utilize the energy contained in the exhaust gas of the internal combustion engine or of the fuel cell in order to efficiently compress air to be supplied to the internal combustion engine or to the fuel cell, so that particularly high specific power and torque of the internal combustion engine or of the fuel cell may be provided.

Further advantages, features, and particulars of the invention will become more readily apparent from the following description of a preferred exemplary embodiment thereof with reference to the accompanying drawings. The features and feature combinations mentioned above, as well as the features and feature combinations mentioned below in the description of the figures and/or shown in the figures are usable not only in the particular stated combination, but also in other combinations or alone without departing from the scope of the invention.

BRIEF DESCRIPTION OF THE DRAWINGS

FIG. 5 shows part of a schematic longitudinal sectional view of the turbine according to FIG. 4, with the adjusting device in the second position;

FIG. 6 shows part of a schematic longitudinal sectional view of the turbine according to FIGS. 4 and 5, with the adjusting device in the first position;

FIG. 7 shows part of a schematic cross-sectional view of the turbine according to FIG. 6 along a sectional line A-A in FIG. 6;

FIG. 8 shows part of a schematic longitudinal sectional view of the turbine according to FIGS. 4 through 7, with the adjusting device in the second position and a bypass channel of the turbine fluidly blocked;

FIG. 9 shows part of a schematic cross-sectional view of the turbine according to FIG. 8 along a sectional line A-A in FIG. 8;

FIG. 10 shows part of a schematic longitudinal sectional view of the turbine position and the bypass channel fluidly enabled;

FIG. 11 shows part of a schematic cross-sectional view of the turbine according to FIGS. 4 through 9 with the adjusting device in the second according to FIG. 10 along a sectional line A-A in FIG. 10;

FIGS. 12a to 12d each show part of a schematic cross-sectional view of the turbine according to FIGS. 4 through 11, with the adjusting device in the second position and with a different rotational position of the adjusting device in the second position being illustrated in each of FIGS. 12a to 12d; and FIG. 13 shows a respective curve of a throughput characteristic value of the turbine according to FIGS. 1 through 12 over an angle of rotation of the tongue diverter in the first position and in the second position of the adjusting device.

DESCRIPTION OF EXEMPLARY EMBODIMENTS

Figure 1:
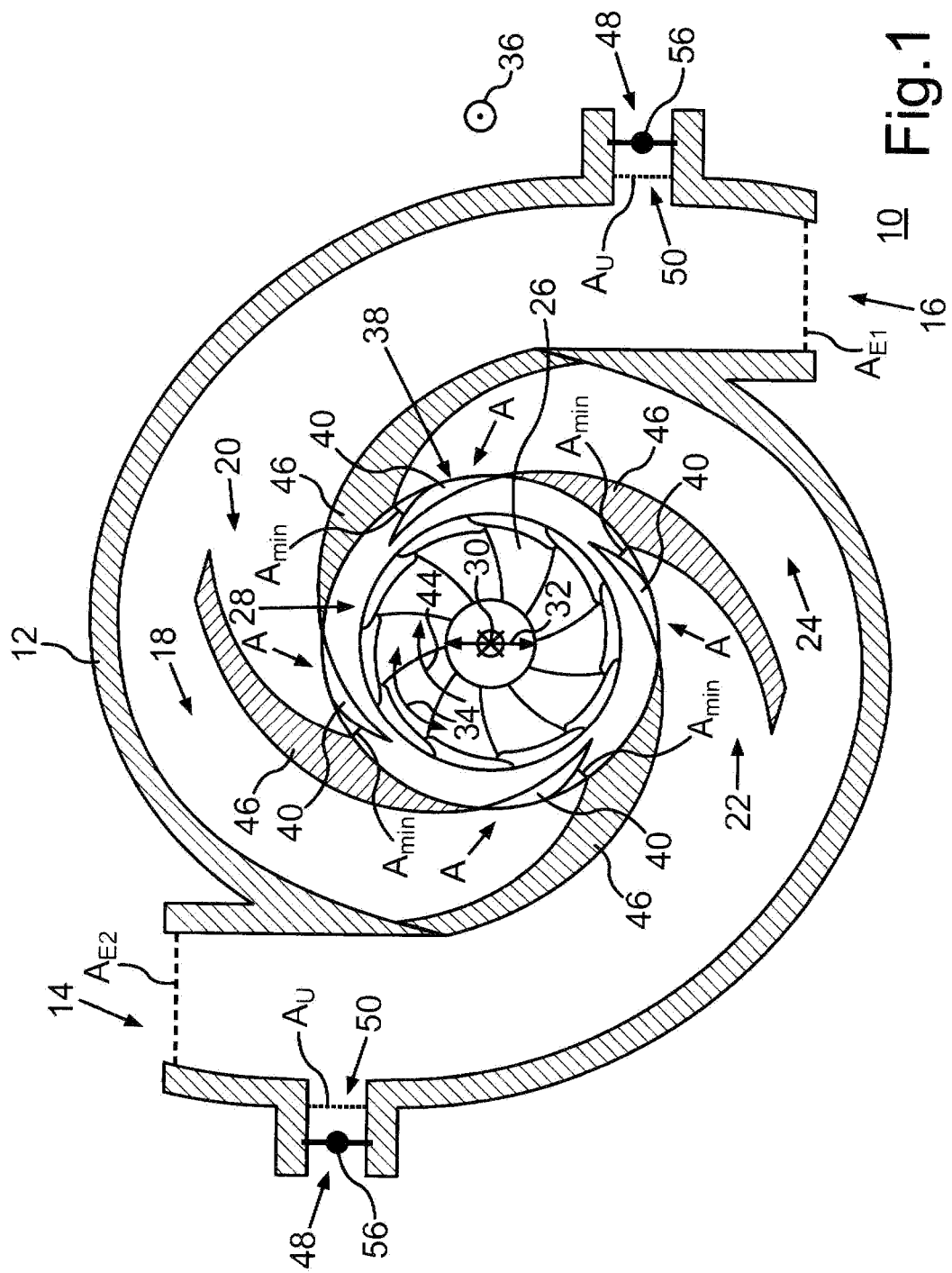
FIG. 1 shows a schematic cross-sectional view of a turbine according to the invention of an exhaust gas turbocharger for an internal combustion engine, which includes an adjusting device which is rotatable, at least partially, in the peripheral direction of a turbine wheel of the turbine about a rotational axis thereof, and which is displaceable between two positions in the axial direction of the turbine wheel, with the adjusting device in a first position of the positions.

FIG. 1 shows a turbine 10 for an exhaust gas turbocharger of an internal combustion engine which is designed as a reciprocating piston machine, for example, and as a gasoline engine, for example. The turbine 10 includes a turbine housing 12 which has a first duct 16 and a second duct 14. Exhaust gas from the internal combustion engine is able to flow through the first duct 16 and the second duct 14. If the internal combustion engine has four cylinders, for example, in which combustion processes take place, exhaust gas from two of the cylinders, for example the first and the fourth cylinders, is associated with the first duct 16 and flows through this first duct 16, whereas exhaust gas from the other cylinders, for example the second and the third cylinders, is associated with the second duct 14 and flows through the second duct 14. The turbine housing 12 also has four spiral channels, a first spiral channel 18, a second spiral channel 20, a third spiral channel 22, and a fourth spiral channel 24, via which a turbine wheel 26, which is accommodated in an accommodation space 28 formed by the turbine housing 12 and which is rotatable about a rotational axis 30, may be acted on by exhaust gas. For this purpose, the first spiral channel 18 and the second spiral channel through the first duct 16 is able to overflow into the first spiral channel 18 and the second spiral channel 20. In other words, the first duct 16 is divided into the first spiral channel 18 and the second spiral channel 20 downstream from an inlet cross section $A_{E1}$ of the first duct 16 and upstream from the turbine wheel 26, so that the first duct 16 upstream from the first spiral channel 18 and the second spiral channel 20 functions as a supply and collection channel for the first spiral channel 18 and the second spiral channel 20.

On the other hand, the first spiral channel 18 and the second spiral channel 20 open into the accommodation space 28, so that the exhaust gas is able to flow from the first spiral channel 18 and the second spiral channel 20 into the accommodation space 28, and to flow radially inwardly against the turbine wheel. The turbine 10 is thus a radial turbine.

The same applies for the second duct 14 and the third spiral channel 22 and fourth spiral channel 24. On the one hand, the third spiral channel 22 and the fourth spiral channel 24 are fluidly connected to the second duct 14, so that the duct is divided into the third spiral channel 22 and the fourth spiral channel 24 downstream from an inlet cross section $A_{E2}$ and upstream from the turbine wheel 26. Thus, the second duct 14 upstream from the third spiral channel 22 and the fourth spiral channel 24 also functions as a supply and collection channel for these two spiral channels. On the other hand, the third spiral channel 22 and the fourth spiral channel 24 open into the accommodation space 28 and are thus fluidly connected thereto, so that exhaust gas flowing through the second duct 14 and the third spiral channel 22 and the fourth spiral channel 24 flows into the accommodation space 28, and is thus able to flow against and drive the turbine wheel 26 at least essentially in the radial inward direction.

As is apparent from FIG. 1, outlet cross sections A of the spiral channels 18, 20, 22, 24 are uniformly distributed one behind the other over the periphery of the turbine wheel 26 in the peripheral direction of the turbine wheel 26, indicated by a directional arrow 34. The outlet cross sections A are situated at the same level in the axial direction of the turbine wheel 26, as indicated by a directional arrow 36.

To be able to flexibly adapt the turbine 10 to different operating points of the internal combustion engine according to demand, in particular in light of a pronounced non-steady-state characteristic of the gasoline engine, and thus to be able to at least essentially always efficiently operate in the entire characteristic map of the internal combustion engine, the turbine 10 includes an adjusting device 38 in the form of a tongue diverter. The device 38 includes airfoil-shaped blocking elements 40 which are referred to as tongues, each blocking element 40 being associated with one of the spiral channels 18, 20, 22, 24 and a respective turbine inlet cross section A.

Figure 4:
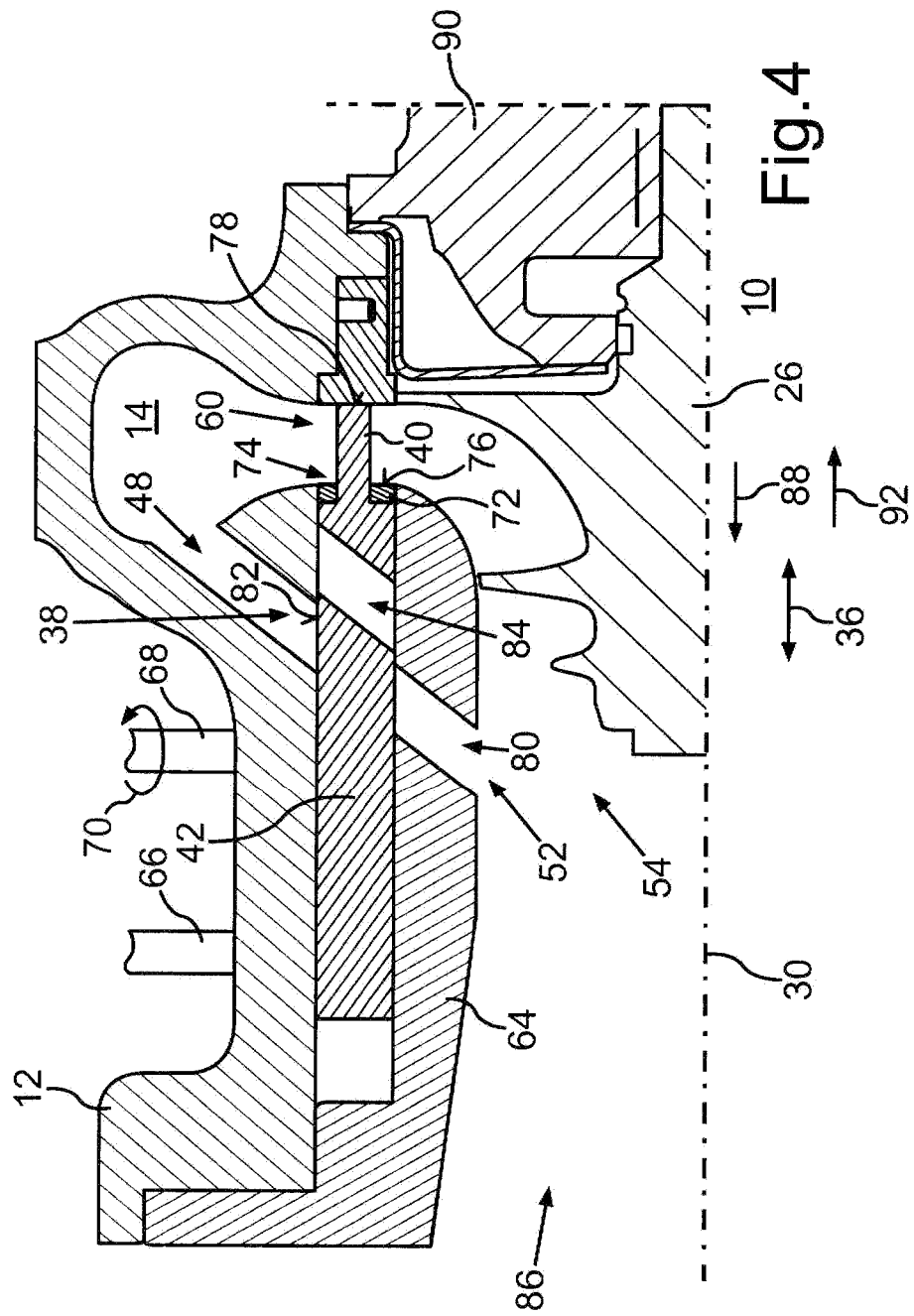
FIG. 4 shows part of a schematic longitudinal sectional view of another embodiment of the turbine according to FIGS. 1 through 3, with the adjusting device in the first position.

The blocking elements 40 are fixedly connected to an adjusting ring 42, not illustrated in FIG. 1 but illustrated in FIG. 4. In addition, the blocking elements 40 and the adjusting ring 42 are rotatable about the rotational axis 30 of the turbine wheel 26 in the peripheral direction of the turbine wheel 26 (directional arrow 34). A narrowest flow cross section in the direction of flow of the exhaust gas through the spiral channels 18, 20, 22, 24 may be variably set upstream from the turbine wheel 26 by rotating the blocking elements 40 via the adjusting ring 42, which is rotatable together with the blocking elements 40, since the adjusting device 38 and the adjusting ring 42, and the blocking elements 40 are rotatable at least essentially continuously and in a stepless manner in an adjustment angle range of at least essentially 60°, for example.

In FIG. 1 the blocking elements 40 are in a rotational position of the adjustment angle range, provided as a first end position, in which a minimally adjustable flow cross section $A_{min}$ of the spiral channels 18, 20, 22, 24 is set. If the blocking elements 40 and the adjusting ring 42 are successively rotated in the peripheral direction, starting from this first end position, in the direction of a directional arrow 44, this is accompanied by a successive enlargement of the narrowest flow cross section of the spiral channels 18, 20, 22, 24 upstream from the turbine wheel 26.

This setting of the narrowest flow cross section is possible in a first position of the adjusting device 38 relative to the axial direction of the turbine wheel 26. In this first position of the adjusting device 38, the narrowest flow cross section on the one hand is delimited by walls 46 which are fixed relative to the turbine housing 12 and which delimit the spiral channels 18, 20, 22, 24, at least in parts, and [on the other hand] is delimited in parts by the blocking elements 40, In the first axial position of the adjusting device 38, exhaust gas flowing through the spiral channels 18, 20, 22, 24 flows against and around the blocking elements 40.

The turbine 10 also includes bypass channels 48 which are fluidly connected to the second duct 14 and the first duct 16 at branch points 50. Exhaust gas is able to flow from the ducts 14, 16 into the bypass channels 48 at the branch points 50, as the result of which exhaust gas is branched from the ducts 14, 16 upstream from the turbine wheel 26. The bypass channels 48 allow exhaust gas to bypass the turbine wheel 26 without acting on, and driving, the turbine wheel. For this purpose, the bypass channels 48 open into a turbine wheel outlet area 54 (FIG. 4) downstream from the turbine wheel 26 at inlet points 52 (FIG. 4).

Valve devices 56 are situated in the bypass channels 48, by means of which a flow cross section Au of the bypass channels 48 is variably settable. The valve devices 56 are able to fluidly block the flow cross sections $A_U$ so that no exhaust gas may flow through the bypass channels 48. Likewise, the valve devices 56 allow the flow cross sections $A_u$ to be fluidly enabled, at least in parts, so that exhaust gas can flow through the bypass channels 48 and thus bypass the turbine wheel 26. As shown in FIG. 1, the valve devices 56 are in a position which blocks the bypass channels 48 so that no exhaust gas is able to flow through the bypass channels 48.

In the first position of the adjusting device 38, in which the narrowest flow cross section upstream from the turbine wheel 26 is variably settable by means of the blocking elements 40, a so-called tongue diverter mode of the turbine 10 is provided. A throughput parameter, which is also referred to as a throughput characteristic value φ, may thus be variably set by rotating the adjusting ring 42 and the adjusting [sic; blocking] elements 40.

Figure 2:
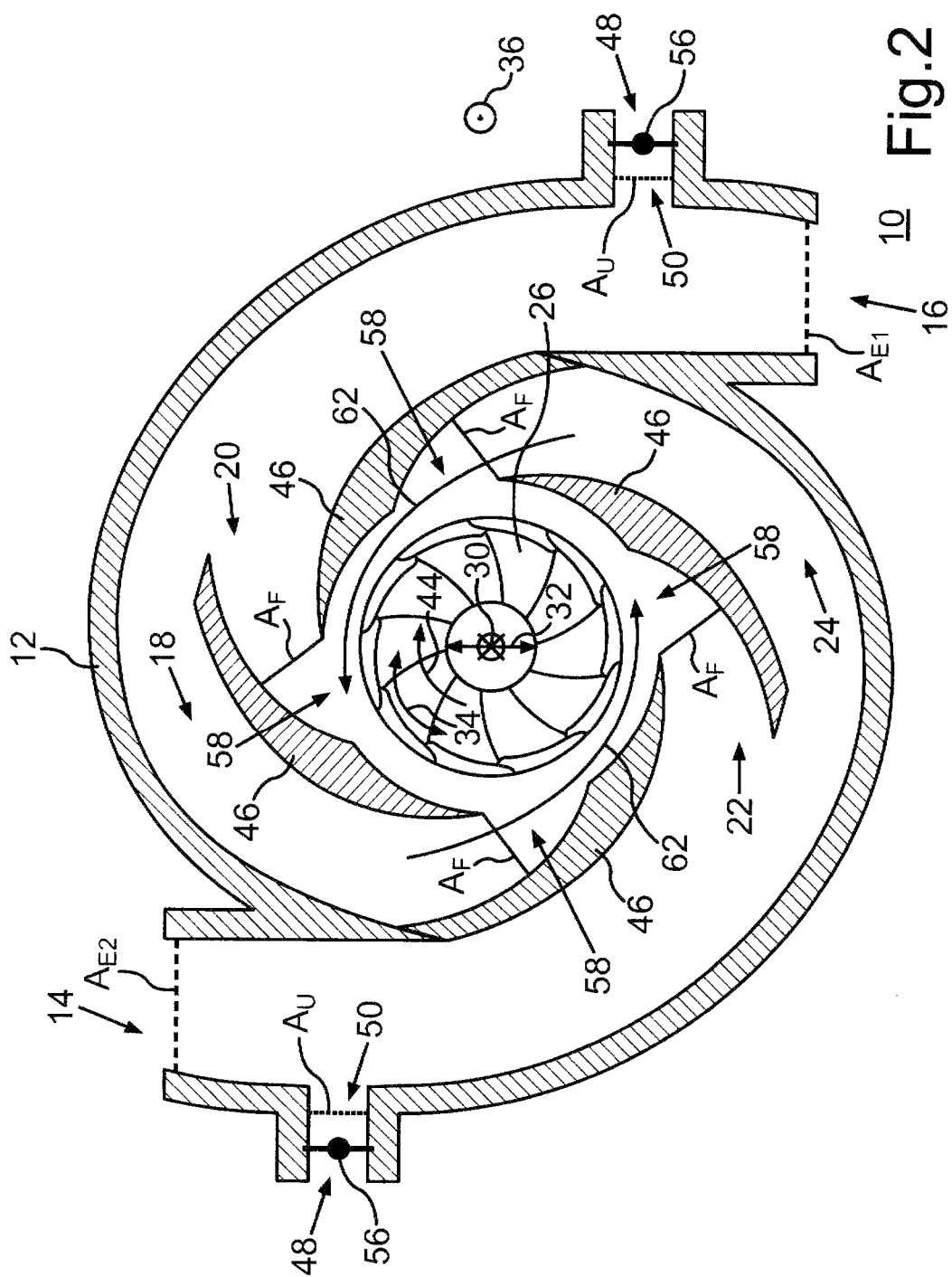
FIG. 2 shows a schematic cross-sectional view of the turbine according to FIG. 1, with the adjusting device in the second of the positions.

FIG. 2 shows the turbine 10 with the adjusting device 38 set in a second position in the axial direction of the turbine wheel 26, as indicated by the directional arrow 36. The adjusting device 38 is movable, in particular displaceable, solely between the first position and the second position in the axial direction of the turbine wheel 26. In the second position the blocking elements 40 are at a distance from a turbine wheel inlet area 58, so that they no longer protrude into a ring nozzle 60 (FIG. 4) above the turbine wheel 26 as in the first position, and in comparison to the first position, exhaust gas no longer flows, or flows only in a very small area, against or around the blocking elements. Although the adjusting ring 42 and the blocking elements 40 are also rotatable about the rotational axis 30 in the peripheral direction in the second position, this rotation, does not, or no longer, cause(s) a change in the narrowest flow cross section upstream from the turbine wheel 26. The narrowest flow cross section is denoted by reference character AF in FIG. 2, and is delimited by the walls 46 which are fixed relative to the turbine housing 12, and is no longer delimited in parts by the blocking elements 40.

In the second position of the adjusting device 38, a so-called backpressure or accumulation turbine mode of the turbine 10 is achieved in which the internal combustion engine is charged by accumulation charging. The ducts 14, 16, i.e., the spiral channels 18, 20, 22, 24, now are no longer fluidly separate from one another until directly upstream from the turbine wheel 26, as in the first position of the adjusting device 38, but instead are fluidly connected to one another in the turbine wheel inlet area 58 upstream from the turbine wheel 26. In other words, the second duct 14 is in direct fluid connection with the first duct 16 above the turbine wheel 26. Exhaust gas may thus flow from the second duct 14, i.e., the third spiral channel 22 and the fourth spiral channel 24, of which segments are illustrated, into the first duct 16, i.e., the first spiral channel 18 and the second spiral channel 20, of which segments are likewise illustrated, and vice versa. This flow of the exhaust gas is indicated by directional arrows 62 in FIG. 2.

Figure 3:
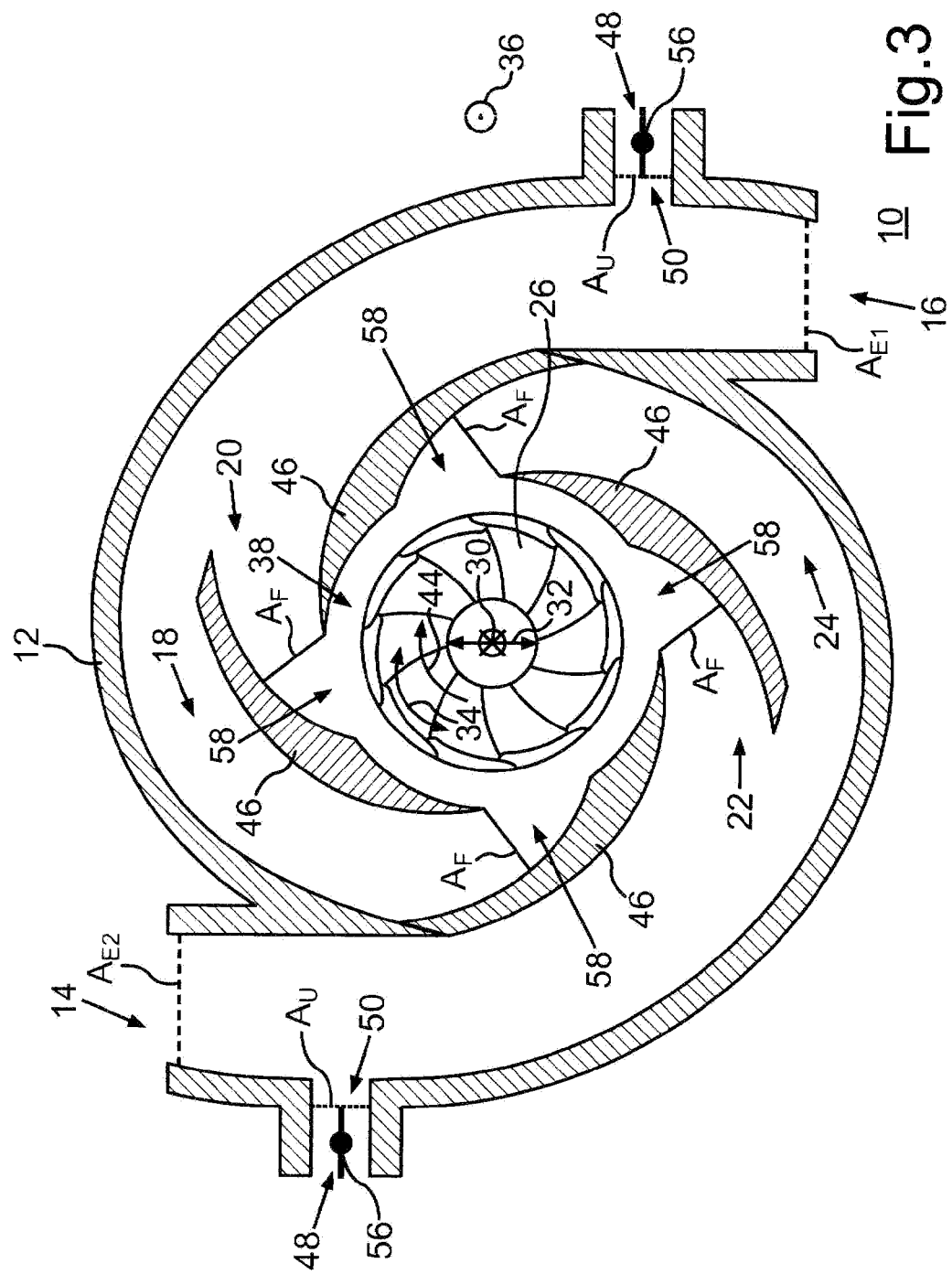
FIG. 3 shows a schematic cross-sectional view of the turbine according to FIGS. 1 and 2, with bypass channels of the turbine fluidly enabled, so that exhaust gas may bypass the turbine wheel without driving the turbine wheel.

The turbine 10 according to FIG. 3 is likewise operated in accumulation turbine mode, in which the ducts 14, 16 are fluidly connected to one another. In contrast to an impulse turbine mode according to FIG. 2, however, the valve devices 56 are open, so that the bypass channels are open. Thus, exhaust gas can flow from the ducts 14, 16 into the bypass channels 48, and bypass the turbine wheel 26 without driving it.

The bypass channels 48 are advantageously integrated at least in parts, in particular completely, into the turbine housing 12, and extend within the turbine housing 12, which keeps the installation space requirements of the turbine 10 small.

The throughput parameter of the turbine 10 may be increased by displacing the adjusting device 38 from the first position shown in FIG. 1 into the second position shown in FIGS. 2 and 3. If the bypass channels 48 are additionally fluidly enabled, as illustrated in FIG. 3, this is accompanied by a further increase in the throughput parameter (throughput characteristic value $\phi$) of the turbine 10. In combination with the setting of the narrowest flow cross section by the blocking elements 40 in the first position of the adjusting device 38, the turbine 10 thus has a very high throughput range with a very high throughput coefficient $\phi_{max}/\phi_{min}$, where $\phi_{max}$ denotes the largest possible settable throughput characteristic value and $\phi_{min}$ denotes the smallest possible settable throughput characteristic value of the turbine 10.

The smallest possible settable throughput characteristic value $\phi_{min}$ is set, for example, when the bypass channels 48 are fluidly blocked by means of the valve devices 56, so that no exhaust gas can flow through the bypass channels 48, and when the adjusting ring 42 and the blocking elements 40 are in the first end position shown in FIG. 1.

Starting from this first end position, in the first position of the adjusting device 38 the blocking elements 40 and the adjusting ring 42 are rotatable into a rotational position which is provided as a further end position, resulting in a larger cross sectional setting compared to the narrowest flow cross section $A_{min}$. This cross section is then the largest possible setting of the narrowest flow cross section upstream from the turbine wheel 26 in the first position of the adjusting device 38. In this end position, the turbine 10 has a larger throughput parameter compared to the first end position.

However, this throughput parameter may be increased even further. The largest possible settable throughput parameter of the turbine 10 is set, for example, when the adjusting device 38 is in its second position and the bypass channels 48 are maximally enabled by means of the valve devices 56, for example by fully opening the valves of the bypass channels 48. This is shown with reference to FIG. 3.

FIG. 4 shows an alternative embodiment of the turbine 10 according to FIGS. 1 through 3 in the impulse turbine mode, with the bypass channel 48 fluidly blocked and with exhaust gas unable to flow through from the duct 14, for example.

As is apparent from FIG. 4, the adjusting ring 42 and the blocking elements 40 are formed together as one piece. The adjusting device 38, referred to as a tongue diverter, is guided in the axial direction on a contour sleeve 64 of the turbine 10, as indicated by the directional arrow 36. The contour sleeve 64 is designed as a separate part with respect to the turbine housing 12, and delimits an inner contour in the turbine wheel outlet area 54, so that after the exhaust gas acts on and drives the turbine wheel 26, it may flow away from the turbine wheel in a flow-optimized manner. The contour sleeve 64 is centered in the turbine housing 12.

FIG. 4 schematically illustrates an actuating part 66 via which the adjusting device 38 may be axially displaced solely between the first position and the second position. In addition, FIG. 4 illustrates a further actuating part 68 via which the adjusting device 38 may be rotated about the rotational axis 30 in the peripheral direction of the turbine wheel 26, as indicated by a directional arrow 70 in FIG. 4.

In addition, a matrix 72 is provided which likewise is rotatable together with the adjusting ring 42 and the blocking element 40 relative to the turbine housing 12, about the rotational axis 30 in the peripheral direction. However, in the axial direction the matrix 42 is fixed relative to the turbine housing 12. The matrix 72 has openings 74 which correspond in each case to the blocking elements 40 and in which the blocking elements 40 may be accommodated, in particular in the second position. The matrix 72 also has a wall 76, facing the ring nozzle 60, which delimits the ring nozzle in parts in the axial direction.

In the second position illustrated in FIG. 5, for example, the ring nozzle 60 is also delimited in the axial direction by an end face-side wall 78 of the blocking element 40 or blocking elements 40. Thus, although the exhaust gas which flows through the ring nozzle 60 flows, at least in parts, against the blocking elements 40 in the second position, the exhaust gas does not flow around the blocking elements as in the first position, and the blocking elements are completely remote from the ring nozzle 60.

The contour sleeve 64 has a first opening 80 which corresponds to the bypass channel 48 in the turbine housing 12. However, an overflow of exhaust gas, which flows into the bypass channel 48, into the first opening 80 is prevented due to the fact that a wall 82 of the adjusting ring 42 fluidly blocks the bypass channel 48.

Depending on the position of the adjusting device 38 in the axial direction and the angle of rotation of the adjusting ring 42, the bypass channel 48 is fluidly enabled, at least in parts, or in contrast is in particular completely fluidly blocked, so that bypassing the turbine wheel 26 via the bypass channel 48 and the first opening 80 is made possible or prevented, respectively.

For this purpose, the adjusting ring 42 likewise has a second opening 84 which is delimited by the wall 82. If the adjusting device 38 is moved into the second position in the axial direction and rotated into a corresponding rotational position in the adjustment angle range, the second opening 84 may be moved, at least in parts, into alignment with the bypass channel 48 and with the first opening 80 in the contour sleeve 64, so that an overflow of exhaust gas from the bypass channel 48 via the second opening 84 into the first opening 80 and from the first opening into the turbine wheel outlet area 54 is made possible. As a result, exhaust gas can flow into the turbine wheel outlet area 54 at the inlet point 52. Also, the valve functionality of variably setting the flow cross section Au of the bypass channel 48 is integrated into the adjusting ring 42 of the adjusting device 38.

For moving the adjusting device 38 from the first position shown in FIG. 4 into the second position shown in FIG. 5, for example, the adjusting device 48 is axially displaced in the direction of a turbine outlet 86 of the turbine 10, as indicated by a directional arrow 88. For moving the adjusting device 38 from the second position into the first position, the adjusting device 38 is displaced in the axial direction toward a bearing housing 90 of the exhaust gas turbocharger, as indicated by a directional arrow 92, FIG. 5 shows the turbine 10 according to FIG. 4, with the adjusting device 38 in the second position and the bypass channel 48 or the bypass channels 48 fluidly enabled. This means that the exhaust gas flowing through the duct 14 partially flows against the turbine wheel 26 and drives same, as indicated by a directional arrow 94. A portion of the exhaust gas also flows through the bypass channel 48, the second opening 84, and the first opening 80 into the turbine wheel outlet area 54, as indicated by a directional arrow 96.

The flow cross section $A_U$ of the bypass channel 48 may be variably set by rotating the adjusting device 38 and the adjusting ring 42, and thus the blocking elements 40, into the second position of the adjusting device 38 shown in FIG. 5.

FIGS. 6 and 7 show once again that in the first position of the adjusting device 38 (of the tongue diverter), the bypass channel 48 is always fluidly blocked, and cannot be enabled, even only in parts, not even by rotating the adjusting ring 42 and the blocking elements 40. In other words, the bypass channel 48 in the tongue diverter mode of the turbine 10 is always fluidly blocked, and also cannot be enabled.

FIGS. 8 and 9 show the turbine 10 with the adjusting device 38 in the second position, in which the bypass channel 48 is fluidly blocked but may also be fluidly enabled, at least in parts, in order to bypass the turbine wheel. As is apparent from FIGS. 8 and 9 in conjunction with FIGS. 10 and 11 the opening 84 in the adjusting ring 42 may be moved in the direction of a directional arrow 98 toward the bypass channel 48 and the first opening 80, and aligned, in at least in parts, in particular completely, with the bypass channel 48 and the first opening 80, by rotating the adjusting ring in the peripheral direction (directional arrow 34), as illustrated with reference to FIGS. 10 and 11.

As is likewise apparent from FIGS. 8 through 11, the first opening 80 and the bypass channel 48 are at least essentially in flush alignment with one another, so that when the second opening 84 is completely aligned with the first opening 80 and the bypass channel 48, at least essentially no interfering edges are present for the exhaust gas flowing through the bypass channel 48, the second opening 84, and the first opening 80. In addition to the complete fluid blocking of the bypass channel 48 and the complete fluid enabling thereof shown in FIGS. 8 and 9, the adjusting ring, and thus the second opening 84, may be rotated into intermediate positions, so that the second opening 84 is in alignment with the first opening 80 and the bypass channel 48 only in parts, and the bypass channel 48 and the first opening 80 are overlapped in parts by the wall of the adjusting ring 42. This is illustrated with reference to FIGS. 12a-d.

According to illustration 12a, the turbine 10 is in its tongue diverter mode, with the adjusting device 38 in its first axial position, The bypass channel 48 is always fluidly blocked. The tongue diverter mode is accompanied by a pulse turbine mode of the turbine 10 in which the turbine 10 is operable in a pulse charging mode.

FIG. 12b shows the turbine 10 in its accumulation turbine mode, in which the turbine 10 is operated in an accumulation charge mode and the adjusting device 38 is in its second axial position, However, the bypass channel 48 is fluidly blocked by the adjusting ring 42, and there is no bypassing of the turbine wheel 26.

FIG. 12c shows the turbine 10 in its accumulation turbine mode, with the bypass channel 48 fluidly enabled in parts by an appropriate setting of the adjusting ring 42 as a result of the second opening 84 being in alignment, in parts, with the first opening 80 and the bypass channel 48. This results in a flow cross section $A_U$ of the bypass channel 48 which is larger compared to the fluid blocking of the bypass channel 48, but smaller compared to a complete fluid enabling of the bypass channel 48.

According to FIG. 12d, the turbine 10 is in its accumulation turbine mode, in which the adjusting device 38 is set in the second axial position. The bypass channel 48 is now completely fluidly enabled, so that a maximum settable quantity of exhaust gas is branched from the duct 14 and bypasses the turbine wheel 26.

FIG. 13 shows a diagram 100 in which the adjustment angle range β of the adjusting device 38, and thus of the blocking elements 40 and of the adjusting ring 42, is illustrated on the abscissa 102. The adjustment angle range β is delimited on the one hand by a first rotational position βmin, which represents an end position of the adjusting device 38 in the adjustment angle range β. On the other hand, the adjustment angle range β is delimited by a second rotational position $β_{max}$, which represents a further end position of the adjusting device 38 in the adjustment angle range β. In other words, the adjusting device 38 is rotatable in the peripheral direction between the rotational positions $β_{min}$ and $β_{max}$, whereby also at least practically any rotational position of the adjustment angle range β between the end positions is settable.

The throughput characteristic value ϕ of the turbine 10 is illustrated on the ordinate 104 of the diagram 100. The smallest possible throughput characteristic value $ϕ_{min}$ and the largest possible throughput characteristic value $ϕ_{max}$ may be set by displacing the adjusting device 38 in the axial direction between the first position and the second position, and by rotating the adjusting device 38 within the adjustment angle range β.

When the turbine 10 is in its tongue diverter mode, i.e., with the adjusting device 38 displaced into the first position and the bypass channel 48 or the bypass channels 48 fluidly blocked, this results in a curve 106 of the throughput characteristic value ϕ illustrated in the diagram 100. Starting from a small rotational position, a small angle of rotation, of the adjusting device 38 toward a comparatively larger rotational position or angle of rotation of the adjusting device 38, the flow cross section (neck cross section) of the spiral channels 18, 20, 22, 24, and thus the throughput characteristic value ϕ, successively increases. In other words, an increase in the angle of rotation is accompanied by an increase of the throughput characteristic value ϕ, with the bypass channel 48 always being closed. For the rotational position $β_{max}$, i.e., this maximum angle of rotation of the adjusting device 38 for a fluidly closed bypass channel 48, the maximum possible narrowest flow cross section is set upstream from the turbine wheel 26, so that in the first axial position of the adjusting device 38 a maximum throughput characteristic value $ϕ_{ZS}$ relative to the first position is provided.

On this basis, the throughput characteristic value ϕ may be further increased by axially displacing the tongue diverter (the adjusting device 38) in the direction of the turbine outlet 86, so that the blocking elements 40 are remote from the ring nozzle 60. If the bypass channel 48 or the bypass channels 48 is/are still fluidly blocked in this state (second axial position of the adjusting device 38), a throughput parameter $ϕ_{ST}$ is provided which is larger than the throughput characteristic value $ϕ_{ZS}$, with the turbine 10 in its accumulation turbine mode. If the rotational position is once again decreased, starting from the maximum rotational position $\beta_{max}$ of the adjusting device 38, with an increasingly smaller rotational position or increasingly smaller rotational angle of the adjusting device 38, the bypass channel 48 or the bypass channels 48 is/are progressively enabled, resulting in an increasingly larger flow cross section $A_U$ of the bypass channels 48. This is accompanied by a further increase in the throughput characteristic value $\phi$ until ultimately, at the minimum rotational position $\beta_{min}$, the bypass channel 48 or the bypass channels 48 is/are maximally fluidly enabled and the maximum possible throughput characteristic value $\phi_{max}$ of the turbine 10 is set. A range 108 in which the accumulation turbine mode of the turbine 10 is present is particularly apparent from the diagram 100. Also particularly apparent from the diagram 100 is a further range 110 in which the tongue diverter mode or the pulse turbine mode of the turbine 10 is present.

The throughput characteristic value $\phi$ is decreased, starting from the maximum possible maximal throughput characteristic value $\phi_{max}$, in a manner analogous to that described above. The bypass channel 48 or the bypass channels 48 is/are initially successively closed and fluidly blocked by increasing the rotational position, i.e., the angle of rotation, of the adjusting device 38, and the adjusting device 38 is subsequently displaced in the axial direction toward the bearing housing, and the throughput characteristic value $\phi$ is reduced by decreasing the rotational position, i.e., the angle of rotation, until ultimately the smallest possible throughput characteristic value $\phi_{min}$ is set at the smallest possible rotational angle.

For an adjustment angle range $\beta$ or rotational angle range of the adjusting device 38, which has a maximum value of 60°, for example, which is limited by the operating principle, this operating strategy allows a particularly large throughput range coefficient $\phi_{max}/\phi_{min}$.

Likewise, a large throughput range coefficient $\phi_{max}/\phi_{min}$ could also be achieved by initially rotating the blocking element 40 in a first rotational direction and subsequently enabling the nozzle 60 due to an axial motion, followed by the adjusting part 42 enabling the bypass channel 48 due to a rotational motion in a second rotational direction which, however, corresponds to the first rotational direction.

What is claimed is:

1. A turbine (10) for an exhaust gas turbocharger of an internal combustion engine having a turbine housing (12) with an accommodation space (28), a turbine wheel (26) rotatably supported in the accommodation space (28), the housing (12) further including a spiral channel (18, 20, 22, 24) through which exhaust gas may flow, the spiral channel having a flow cross-section (A) for directing the exhaust gas flow onto the turbine wheel (26) which is supported in the accommodation space (28) so as to be rotatable about a rotational axis (30), at least one blocking element (40) arranged rotatably around the turbine wheel in the flow cross-section (A) and also being movable in the axial direction (36) of the turbine wheel (26) between at least a first, extended position and a second, retracted position, the turbine housing (12) having at least two ducts (14, 16) and the turbine (10) being operable in an impulse turbine mode in the extended axial positions of the blocking element (40) and in a back-pressure or accumulation turbine mode in the retracted axial position of the blocking element (40), the turbine (10) having a throughput parameter ($\phi$) which, in the impulse turbine mode, is adjustable by rotation of the blocking element (40) in the extended position and which, in the accumulation turbine mode, is adjustable by rotation of the blocking element (40) in its retracted position.

2. The turbine (10) according to claim 1, wherein in the axial direction (36) the blocking element (40) is movable solely between the first position, in which the blocking element (40) is situated, at least in parts, in a turbine wheel inlet area (58), and the second position, in which the blocking element is at a distance from, in particular completely remote from, the turbine wheel inlet area (58) with respect to the first position.

3. The turbine (10) according to claim 2, wherein for moving from the first position into the second position the blocking element (40) is movable in the direction (88) of a turbine outlet (86) of the turbine (10), and for moving from the second position into the first position the blocking element is movable in the opposite direction (92).

4. The turbine (10) according to claim 1, wherein the blocking element (40) is connected to an adjusting part (42) which is movable together with the blocking element (40), by means of which the blocking element (40) is rotatable and axially movable, wherein a bypass channel (48) of the turbine (10) via which exhaust gas may bypass the turbine wheel (26) is fluidly blocked in one of the positions by means of the adjusting part (42), but at least partially open in the other of the positions by means of the adjusting part (42).

5. The turbine (10) according to claim 4, wherein the flow cross-section ($A_u$) of the bypass channel (48) is adjustable in the other position by the adjusting part (42).

6. The turbine (10) according to claim 5, wherein the bypass channel (48) may be fluidly blocked or opened by rotating the adjusting part (42) in a first rotational direction, the first rotational direction of the adjusting part (42) being opposite from a second rotational direction.

7. The turbine (10) according to claim 1, wherein a receiving part (72) is provided in which the blocking element (40) is accommodated, at least in parts, in one of the positions, the receiving part (72) being fixed in the axial direction (36) and rotatable in the peripheral direction (24) of the accommodation space (28).

8. An exhaust gas turbocharger for an internal combustion engine having a turbine (10) with a turbine housing (12) including an accommodation space (28), a turbine wheel (26) rotatably supported in the accommodation space (28), the housing (12) further including a spiral channel (18, 20, 22, 24) through which exhaust gas may flow, the spiral channel having a flow cross-section (A) for directing the exhaust gas flow onto the turbine wheel (26) which is supported in the accommodation space (28) so as to be rotatable about a rotational axis (30), at least one blocking element (40) arranged rotatably around the turbine wheel in the flow cross-section (A) and also being movable in the axial direction (36) of the turbine wheel (26) between at least a first, extended position and a second, retracted position, the turbine housing (12) having at least two ducts (14, 16) and the turbine (10) being operable in an impulse turbine mode in the extended axial positions of the blocking element (40) and in a backpressure or accumulation turbine mode in the retracted axial position of the blocking element (40), the turbine (10) having a throughput parameter (0) which, in the impulse turbine mode, is adjustable by rotation of the blocking element (40) in the extended position and which, in the accumulation turbine mode, is adjustable by rotation of the blocking element (40) in its retracted position.

* * * * *